(12) United States Patent
Mouton et al.

(10) Patent No.: US 8,214,187 B2
(45) Date of Patent: Jul. 3, 2012

(54) METHOD FOR CONSTRUCTING A HYBRID GRID FROM A CPG TYPE GRID

(75) Inventors: Thibaud Mouton, Saint-Cyr-du Conceray (FR); Chakib Bennis, Rueil-Malmaison (FR); Houman Borouchaki, Paris (FR); Frédéric Roggero, Rueil-Malmaison (FR)

(73) Assignee: IFP, Cedex (FR)

( * ) Notice: Subject to any disclaimer, the term of this patent is extended or adjusted under 35 U.S.C. 154(b) by 465 days.

(21) Appl. No.: 12/490,554

(22) Filed: Jun. 24, 2009

(65) Prior Publication Data

US 2010/0017181 A1 Jan. 21, 2010

(30) Foreign Application Priority Data

Jun. 27, 2008 (FR) ...................................... 08 03689

(51) Int. Cl.
*G06F 7/48* (2006.01)
(52) U.S. Cl. ...................... 703/10; 703/2; 703/9; 702/12
(58) Field of Classification Search .................. 703/2, 9, 703/10; 702/6, 11–13
See application file for complete search history.

(56) References Cited

U.S. PATENT DOCUMENTS

| | | | |
|---|---|---|---|
| 6,907,392 B2 * | 6/2005 | Bennis et al. ................... | 703/10 |
| 7,047,165 B2 * | 5/2006 | Balaven et al. .................. | 703/2 |
| 7,596,480 B2 * | 9/2009 | Fung et al. ....................... | 703/10 |
| 7,617,083 B2 * | 11/2009 | Bennis et al. .................... | 703/10 |
| 7,634,395 B2 * | 12/2009 | Flandrin et al. ................. | 703/10 |
| 7,778,810 B2 * | 8/2010 | Flandrin et al. ................. | 703/10 |
| 2001/0006387 A1 * | 7/2001 | Bennis et al. ................... | 345/418 |

FOREIGN PATENT DOCUMENTS

FR 2 891 383 3/2007

OTHER PUBLICATIONS

Flandrin et al., "3D Hybrid Mesh Generation for Reservoir Flow Simulation", proceedings, International Roundtable, Sep. 19, 2004, XP002383827.
Flandrin et al., "Diagrammes de puissance conformes pour l'ingenierie de reservoir", Mechanique et Industries, Elsevier, Paris, Fr, vol. 6, May 1, 2005, pp. 369-379, XP002383788, ISSN: 1296-2139.

* cited by examiner

*Primary Examiner* — Russell Frejd
(74) *Attorney, Agent, or Firm* — Antonelli, Terry, Stout & Kraus, LLP.

(57) ABSTRACT

This method for evaluating fluid flows in a heterogeneous medium, uses a hybrid grid constructed from a CPG type structured grid and from a radial grid. The first stage includes locally deforming a CPG type grid into a non-uniform Cartesian grid. These local grid cell deformations correspond to the change from a "CPG" frame to a "Cartesian" frame defined by the deformation. These deformations are then quantified, by a deformation function $\phi$, and applied to the radial grid so as to shift to the "Cartesian" frame. The second stage includes locally correcting the definition of this deformation function around the radial grid, so that the radial grid, in the "Cartesian" frame, keeps its geometrical characteristics. A hybrid grid is then generated in the "Cartesian" frame from the two grids thus deformed. Finally, this hybrid grid is deformed to return to the "CPG" frame, using the inverse of deformation function $\phi$.

9 Claims, 2 Drawing Sheets

METHOD FOR CONSTRUCTING A HYBRID GRID FROM A CPG TYPE GRID

FIELD OF THE INVENTION

The present invention relates to the study of fluid flows within a heterogeneous formation.

The method applies particularly to the study of displacement of fluids such as hydrocarbons in a reservoir or in an underground reservoir crossed by one or more wells, or by fractures or faults.

During development of a hydrocarbon reservoir, it is essential to be able to simulate gas or oil production profiles in order to assess its cost-effectiveness, to validate or to optimize the position of the wells ensuring development. The repercussions of a technological or strategic change on the production of a reservoir also have to be estimated (selection of the location of new wells to be drilled, optimization and selection during well completion, . . . ). Flow simulation calculations are therefore carried out within the reservoir. They allow to predict, according to the position of the wells and to certain petrophysical characteristics of the medium, such as porosity or permeability, the evolution over time of the proportions of water, gas and oil in the reservoir.

First of all, better understanding of these physical phenomena requires three-dimensional (3D) simulation of the multiphase flows in increasingly complex geologic structures, in the vicinity of several types of singularities such as stratifications, faults and complex wells.

It is therefore essential to provide numerical schemes with a correctly discretized field of study. Generation of a suitable grid then becomes a crucial element for oil reservoir simulators because it allows to describe the geometry of the geologic structure studied by means of a representation in discrete elements. This complexity has to be taken into account by the grid, which has to reproduce as accurately as possible the geology and all its heterogeneities.

Furthermore, to obtain a precise and realistic simulation, the grid has to be suited to the radial directions of flow in the vicinity of the wells, in the drainage zones.

Finally, grid construction techniques have made great advances during the past few years in other fields such as aeronautics, combustion in engines or structure mechanics. However, the gridding techniques used in these other fields cannot be applied as they are to the petroleum sphere because the professional constraints are not the same. The numerical schemes are of finite difference type, which requires using a Cartesian grid too simple to describe the complexity of the subsoil heterogeneities or, for most of them, of finite element type, suited to solve elliptic or parabolic problems, and not hyperbolic equations such as those obtained for saturation. Finite difference and finite element type methods are therefore not suited for reservoir simulation, only finite volume type methods are. The latter is the most commonly used method for reservoir simulation and modelling. It consists in discretizing the field of study into control volumes on each one of which the unknown functions are approximated by constant functions. In the case of cell-centered finite volumes, the control volumes correspond to the cells and the discretization points are the centres of these cells. The advantage of this method is that the definition of the control volumes is readily generalized to all grid types, whether structured, unstructured or hybrid. Besides, the finite volume method remains close to the physics of the problem and respects the mass conservation principle (the mass balances of the various phases are written on each cell). Furthermore, it is particularly well suited to the solution of hyperbolic type non-linear equations. It is therefore particularly suitable for solution of the hyperbolic saturation system. We will therefore use hereafter cell-centered finite volume methods as a basis.

In short, the grid allowing to perform reservoir simulations has to be suited to:

describe the complexity of the geometry of the geologic structure studied, the radial directions of flow in the vicinity of the wells, in the drainage zones, simulations by means of cell-centered finite volume type methods.

BACKGROUND OF THE INVENTION

The grids provided and used to date in the petroleum sphere are of three types: entirely structured, totally unstructured or hybrid, i.e. a mixture of these two grid types.

Structured grids are grids whose topology is fixed: each inner vertex is incident to a fixed number of cells and each cell is delimited by a fixed number of faces and edges. Cartesian grids (FIG. 2), which are widely used in reservoir simulation, CPG (Corner-Point-Geometry) type grids, described for example in patent FR-2,747,490 (U.S. Pat. No. 5,844,564) filed by the applicant, and grids of circular radial type (FIG. 1) allowing the drainage area of the wells to be modelled, can be mentioned for example.

Unstructured grids have a completely arbitrary topology: a vertex of the grid can belong to any number of cells and each cell can have any number of edges or faces. The topological data therefore have to be permanently stored to explicitly know the neighbours of each node. The memory cost involved by the use of an unstructured grid can therefore become rapidly very penalizing. However, they allow to describe the geometry around wells and to represent complex geologic zones. The grids of PErpendicular BIssector (PEBI) or Voronoï type provided in the following document can for example be mentioned: Z. E. Heinemann, G. F. Heinemann and B. M. Tranta, "*Modelling heavily faulted reservoirs*", Proceedings of SPE Annual Technical Conferences, pp. 9-19, New Orleans, La., September 1998, SPE. Structured grids have already shown their limits: their structured nature facilitates their use and implementation, but they therefore involve a rigidity that does not allow all the geometric complexities of geology to be represented. Unstructured grids are more flexible and they have allowed to obtain promising results but they still are 2.5D grids, i.e. the $3^{rd}$ dimension is obtained only by vertical projection of the 2D result, and their lack of structure makes them more difficult to exploit.

In order to combine the advantages of both approaches, structured and unstructured, while limiting the drawbacks thereof, another type of grid has been considered: the hybrid grid. It is a combination of different grid types and it allows to make the most of their advantages, while trying to limit the drawbacks thereof. A hybrid local refinement method is proposed in: O. A. Pedrosa and K. Aziz, "*Use of hybrid grid in reservoir simulation*", Proceedings of SPE Middle East Oil Technical Conference, pp. 99-112, Bahrain, March 1985. This method consists in modelling a radial flow geometry around a well in a Cartesian type reservoir grid. The junction between the cells of the reservoir and of the well is then achieved using hexahedral type elements. However, the vertical trajectory followed by the centre of the well must necessarily be located on a vertical line of vertices of the Cartesian reservoir grid.

To widen the field of application of this method, in order to take account of the vertical and horizontal wells and of the faults in a Cartesian type reservoir grid, a new hybrid local refinement method has been proposed in: S. Kocberber, "*An automatic, unstructured control volume generation system for geologically complex reservoirs*", Proceedings of the 14$^{th}$ SPE Symposium on Reservoir Simulation, pp. 241-252, Dallas, June 1997. This method consists in joining the reservoir grid and the well grid, or the reservoir grid blocks to the fault edges, by pyramidal) prismatic, hexahedral or tetrahedral type elements. However, the use of pyramidal or tetrahedral cells does not allow a cell-centered finite volume type method to be used.

Patents FR-2,802,324 and FR-2,801,710 filed by the applicant describe another type of hybrid model allowing to take into account, in 2D and 2.5D, the complex geometry of reservoirs and the radial directions of flow in the areas around wells. This hybrid model allows very precise simulation of the radial nature of the flows around wells by means of a cell-centered finite volume type method. It is structured nearly everywhere, which facilitates its use. The complexity inherent in the lack of structure is introduced only where it is strictly necessary, i.e. in the transition zones of reduced size. Calculations are fast and taking account of the directions of flow through the geometry of the wells increases their accuracy. Although this 2.5D hybrid grid has allowed to take a good step forward in reservoir simulation in complex geometries, the fact remains that this solution does not allow to obtain an entirely realistic simulation when the physical phenomena modelled are really 3D. This is the case, for example, for a local simulation around a well.

Furthermore, these hybrid grid construction techniques require creating a cavity between the reservoir grid and the well grid. S. Balaven-Clermidy describes, in "Génération de maillages hybrides pour la simulation des réservoirs pétroliers" (thesis, Ecole des Mines, Paris, December 2001), various methods for defining a cavity between the well grid and the reservoir grid: the minimum size cavity (by simple deactivation of the cells of the reservoir grid overlapping the well grid), the cavity obtained by expansion and the cavity referred to as Gabriel cavity. However, none of these methods is really satisfactory: the space created by the cavity does not allow the transition grid to keep an intermediate cell size between the well grid cells and the reservoir grid cells.

Furthermore, patent application EP/05-291,047,8 filed by the applicant describes another hybrid type method allowing to take into account, in 2D, 2.5D and 3D, the complex geometry of reservoirs and the radial directions of flow in the areas around wells it consists in generating entirely automatically a cavity of minimum size while allowing the transition grid to keep an intermediate cell size between the size of the well grid cells and the size of the reservoir grid cells. This method also allows to construct a transition grid meeting the constraints of the numerical scheme used for simulation. This method provides optimization techniques consisting in providing a posteriori improvement of the hybrid grid, to define a perfectly admissible transition grid in the sense of the numerical scheme selected. This hybrid approach allows to connect a non-uniform Cartesian type reservoir grid to a circular radial type well grid.

However, reservoir modelling by a Cartesian grid is not sufficient to take account of all the geologic complexity thereof. It is therefore necessary to use Corner Point Geometry (CPG) type structured grids to represent them. Generally, CPG grids have quadrilateral faces whose vertices are neither cospherical nor coplanar. The edges of these grids are even, in most cases, non-Delaunay admissible, i.e. the diametral spheres of some edges are non-empty. Now, the method described above cannot manage this type of grid suitably. Current methods allowing hybrid grids to be generated are therefore no longer applicable in the precise case of CPG grids.

The technique described in patent FR-2,891,383 allows to overcome this problem. This method allows to construct entirely automatically conformal transition grids when the reservoir is described by a CPG type grid. It consists in locally deforming a CPG type grid into a non-uniform Cartesian grid. These local grid cell deformations correspond to the change from a reference frame referred to as "CPG" frame to a reference frame referred to as "Cartesian" frame defined by the deformation. These deformations are then quantified and applied to the structured grids so as to shift to the "Cartesian" frame. A hybrid grid is then generated in the "Cartesian" frame from the two grids thus deformed. Finally, this hybrid grid is deformed to return to the "CPG" frame, prior to improving the grid quality by optimizing it under quality control in the sense of the numerical scheme.

However, according to this technique, the stage of local deformation of the CPG type grid to a non-uniform Cartesian grid also modifies the radial grid. In terms of industrial application, this technique is thus limited to cases where the induced deformations remain low, i.e. when the petroleum reservoir is not very complex.

The object of the invention thus relates to an alternative method for evaluating fluid flows in a heterogeneous medium. The method comprises constructing a hybrid grid from a CPG type grid and a radial grid. This method overcomes the aforementioned problems by deforming the CPG type grid into a non-uniform Cartesian grid and by defining, then by correcting a deformation function so that the radial grid in the Cartesian frame keeps the geometrical characteristics necessary for construction of a transition grid.

SUMMARY OF THE INVENTION

The object of the invention is a method for evaluating fluid flows in a heterogeneous medium crossed by at least one geometric discontinuity, from a hybrid grid whose generation comprises forming at least a first CPG type structured grid for gridding at least part of the heterogeneous medium and forming at least a second structured grid for gridding at least part of said geometric discontinuity, said grids consisting of cells defined by their vertices identified by their coordinates in a reference frame referred to as "CPG" frame. The method comprises the following stages:

defining a deformation function $\phi$ by deforming at least part of said first CPG type grid into a non-uniform Cartesian grid whose vertices are then identified by their coordinates in a frame referred to as "Cartesian" frame, discretizing cells of said first CPG grid located around said second grid into tetrahedral cells, interpolating deformation function $\phi$ within each tetrahedral cell so as to allow to determine the coordinates of a point in said "CPG" frame from the coordinates of this point in said "Cartesian" frame, deforming said second grid by expressing the coordinates of its vertices in said "Cartesian" frame, by means of said deformation function $\phi$, modifying said deformation function $\phi$ by displacement of the vertices and recursive adaptive refinement of said tetrahedra, so that said second grid deformed by function $\phi$ is Delaunay admissible and Voronoï admissible, generating in said "Cartesian" frame a hybrid grid by constructing a conformal transition grid between said Cartesian grid and said second grid deformed by function $\phi$ thus modified, deforming said hybrid grid by calculating the coordinates of its vertices in the "CPG" frame, by means of the inverse of said deformation function φ thus modified.

According to the invention, deformation function φ can be modified by applying the following stages:

constructing a third structured grid for gridding said part of said geometric discontinuity around an image trajectory by deformation function φ of an initial trajectory of said discontinuity, modifying deformation function φ by iteratively displacing the vertices of the tetrahedra, so that the vertices of said second grid deformed by function φ thus modified have substantially the same positions as the vertices of said third grid.

The vertices can be displaced by calculating displacement vectors at each vertex of the tetrahedra as follows:

for any tetrahedron containing vertices of said second grid deformed by function φ, assigning to a tetrahedron vertex a weighted mean of the vectors of the vertices present in the tetrahedron, weighting corresponding to a barycentric coordinate of the vertex relative to the vertex of the tetrahedron considered, for any tetrahedron containing no vertex of said second grid, extrapolating the vectors by examining all the other vertices of the tetrahedron located at a predetermined distance and by weighting their associated displacement vector while weighting by a Gaussian function of said distance.

It is also possible to displace the vertices by calculating displacement vectors at each vertex of the tetrahedra by minimizing the deformation of the tetrahedral cells with respect to their shape in said "Cartesian" frame.

Finally, the vertices can be displaced under validity control of the tetrahedral cells: if a vertex displacement makes at least one cell invalid, the vertex is not displaced and the cell is marked "to be refined".

According to an embodiment, the previous stages allowing to modify function φ and to calculate the displacement vectors are applied iteratively until the displacement vectors are zero, then all the cells marked "to be refined" are refined by subdividing them. Cells marked "to be refined" can then be reiterated until they are exhausted.

DETAILED DESCRIPTION

The method according to the invention allows to generate a 3D hybrid grid allowing to take account of physical phenomena occurring close to geometric discontinuities, such as wells or fractures, during reservoir simulations. This grid is, on the one hand, suited to the complexity of the geometry of the geologic structure studied and, on the other hand, to the radial directions of flow in the vicinity of the wells, in drainage zones. In the petroleum sphere, it is also necessary for these grids to be admissible in the finite volume sense. To meet this condition, the grid must have the following properties:

discretization of the flow equations is carried out by two-point approximations. This implies that, through a single face, a cell cannot have more than one neighbouring cell. This property is known as conformity, to express the pressure gradient along the normal to a face, a two-point approximation between the two adjacent cells is used (numerical schemes where the flow approximation is a two-point approximation). This implies that, for each cell, a cell centre (or discretization point) has to be defined. Such an approximation is therefore acceptable only if the line connecting the centres of two adjacent cells is orthogonal to their common face. This property is referred to as grid orthogonality, it immediately follows from the above property that the cells are convex, although, in theory, the discretization points can be located outside their cell, solution of the various unknowns of the flow problem compels to keep them in their cell. The cell is then referred to as self-centered and one speaks of the self-centering property of the grid.

Figure 3:
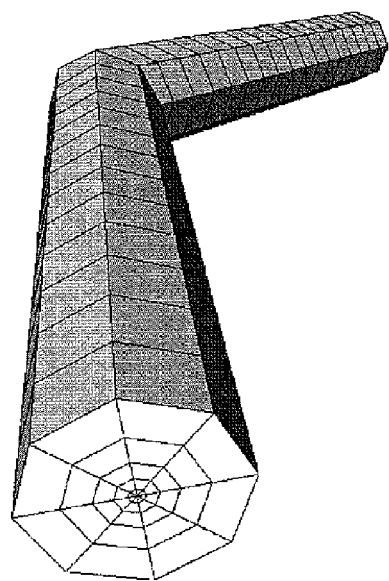
FIG. 3 illustrates a well grid in the "CPG" frame.

The method is presented within the particular context of the grid of a reservoir crossed by a well. Thus, from a CPG type reservoir grid and structured well grids (FIG. 3) known to specialists, the method according to the invention allows to generate a three-dimensional hybrid grid admissible in the finite volume sense.

Since conventional methods for constructing a hybrid grid cannot apply to a CPG type reservoir grid, the first stage consists in locally deforming the CPG type reservoir grid into a non-uniform Cartesian grid. These local grid cell deformations correspond to the change from a frame referred to as "CPG" to a frame referred to as "Cartesian": the vertices of the CPG reservoir grid cells being defined in the "CPG" frame, and the vertices of the Cartesian grid cells being defined in the "Cartesian" frame. The idea is then to quantify this deformation in order to apply it to the well grid. The two grids thus deformed and described in the "Cartesian" frame, it is possible to apply any known method to generate a hybrid grid. Finally, the last stage consists in deforming this hybrid grid to return to the "CPG" frame.

After transferring the hybrid grid in the "CPG" frame, the cells of the power diagram obtained generally have curved (non planar) faces. An optimization procedure can therefore be necessary to best restore the planarity of the faces while respecting the properties relative to the finite volumes, in particular orthogonality.

N.B.: the term "Cartesian" qualifying the "Cartesian" frame refers to the non-uniform Cartesian grid. Thus, the "Cartesian" frame is the frame wherein the coordinates of the non-uniform Cartesian grid are expressed. Similarly, the "CPG" frame is the frame wherein the coordinates of the CPG grid are expressed.

1) Quantified Deformation of the CPG Type Reservoir Grid

The first stage consists in deforming the CPG type reservoir grid into a non-uniform Cartesian grid and in quantifying this deformation by a deformation function.

This stage is described in patent FR-2,891,383. It corresponds to the change from a description of the CPG grid in the "CPG" frame to the "Cartesian" frame, the CPG grid being a non-uniform Cartesian grid in the "Cartesian" frame.

This deformation, which thus generates creation of a "Cartesian" frame, is obtained by projecting the CPG grid of the reservoir upon a non-uniform Cartesian grid. Each cell of the new grid is then defined by the mean lengths of the CPG cells in the three directions X, Y and Z in space.

Figure 1:
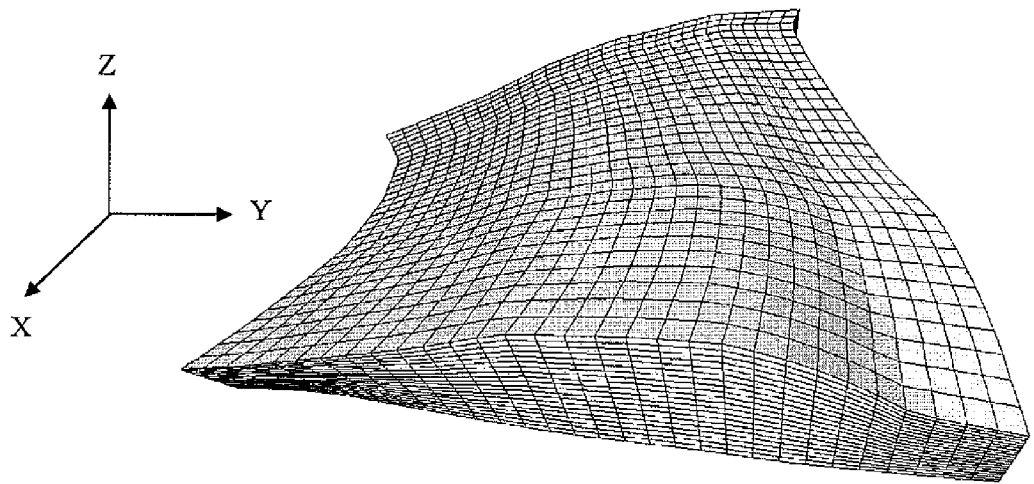
FIG. 1 shows a CPG type reservoir grid described in the "CPG" frame.
Figure 2:
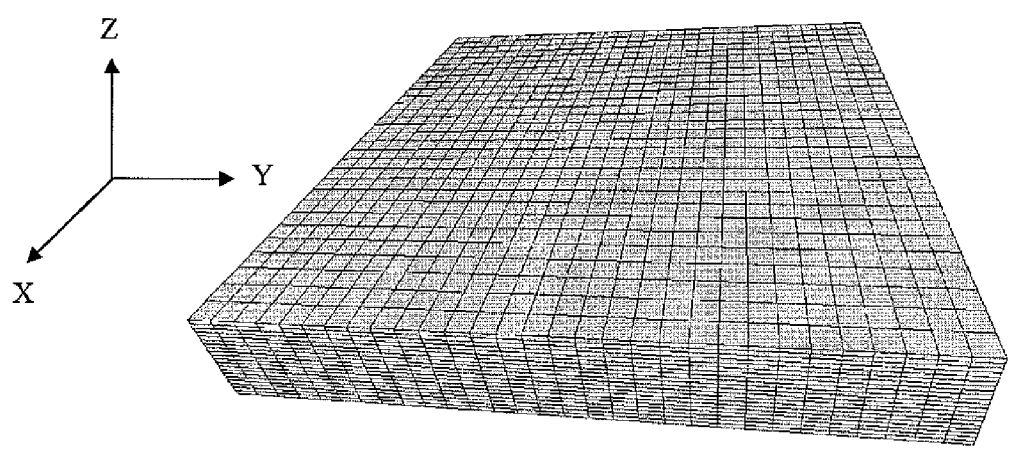
FIG. 2 shows the same grid as in FIG. 1 described in the "Cartesian" frame. This grid is then represented by a non-uniform Cartesian grid.

By way of illustration, FIG. 1 shows a CPG reservoir described in the "CPG" frame and FIG. 2 illustrates the same reservoir described in the "Cartesian" frame. The latter grid is then represented by a non-uniform Cartesian grid.

This change from the "CPG" frame to the "Cartesian" frame thus allows to locally deform cells of the CPG reservoir grid. This deformation can be performed globally, i.e. applied to all of the cells of the reservoir grid, or locally, i.e. applied to only part of the cells of the reservoir grid. It can for example be advantageous to apply a deformation only in the part necessary for construction of the transition grid, i.e. in restricted zones between the reservoir grid and the well grids.

After deforming the CPG type grid into a non-uniform Cartesian grid by displacing the cell vertices, i.e. by changing from the "CPG" frame to the "Cartesian" frame, this deformation is quantified.

In fact, the change from the well grid of "CPG" frame to the "Cartesian" frame, or from the transition grid of "Cartesian" frame to the "CPG" frame, is defined by the deformation induced by the change from the CPG reservoir grid in the "CPG" frame to the Cartesian reservoir grid in the "Cartesian" frame. This deformation is local and it is defined at each hexahedral cell of the reservoir.

A deformation function $\phi$ is therefore defined for each (in the case of a global deformation) cell of the CPG grid. This function is defined discretely at the cell vertices, then it is interpolated within each cell in order to calculate the deformation at any point of the grid. This function allows to go from one frame to the other, i.e. to determine the coordinates of the cell vertices in the "Cartesian" frame from the coordinates of these vertices in the "CPG" frame.

The Cartesian grid is modified in the vicinity of the well: each hexahedral cell of the Cartesian grid is discretized into six tetrahedral cells. An interpolation of deformation function $\phi$ is then defined within each tetrahedral cell so as to allow to determine the coordinates of a point in the "CPG" frame from the coordinates of this point in the "Cartesian" frame. Passage through tetrahedral cells allows to simplify the expression for $\phi$ by changing from a trilinear expression in the hexahedral cells to a linear expression in the tetrahedral cells, easier to use. In fact, the configuration in the Cartesian space of a hexahedral cell is a right-angled parallelepiped. Now, interpolation amounts to calculating the position of a point defined by parameters relative to the cell that contains it, knowing the position of the vertices of this cell. Thus, a point included in a hexahedral cell is defined by eight parameters. These parameters can be expressed in the reference space but they have no analytical expression in the real space. Determination of the parameters of a point in the real space (deformed hexahedron) therefore requires least-squares calculation consisting in a costly optimization routine. By discretizing the hexahedra to tetrahedra, the interpolation function of the deformation can then be simplified and the analytical expression of the parameters exists then in the real space and in the Cartesian space.

2) Correction of the Deformation Function at the Edge of the Radial Grid

The well grid is then deformed by expressing the coordinates of its vertices in the "Cartesian" frame by means of the deformation function.

Figure 4:
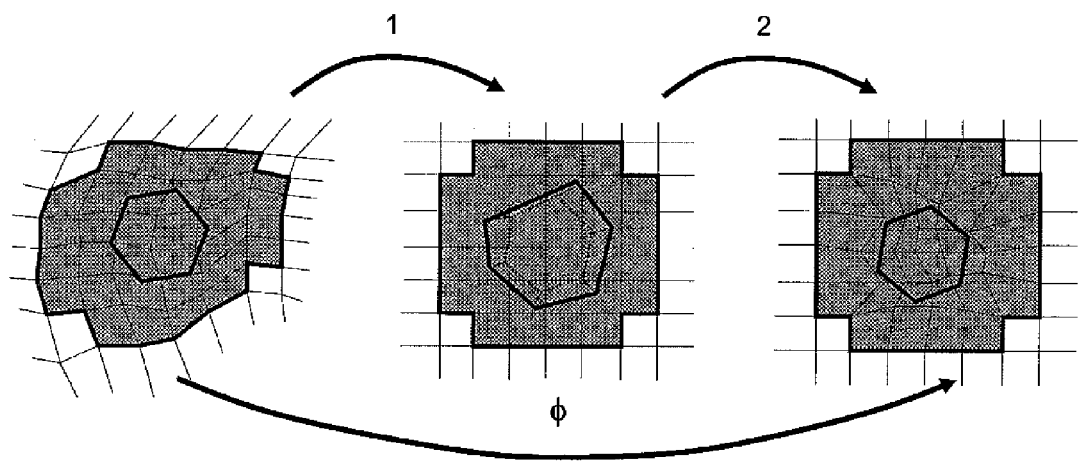
FIG. 4 illustrates in 2D the stages of change from the CPG space to the Cartesian space and of correction of the Cartesian space.

This deformation being generally too large (case of large-deformation CPG grid), the conditions required for generation of a hybrid grid are no longer met: the geometrical properties of the radial grid boundary do not allow a polyhedral grid to be generated. It can be reminded that the conditions required for generation of a hybrid grid are the Delaunay admissibility and the Voronoï admissibility of the faces of the outer surface of the radial grid (radial grid boundary). It can also be reminded that the boundary of the cavity is Delaunay admissible if the edges of the faces that make it up belong to the Delaunay triangulation obtained from its vertices Similarly, the boundary of the cavity is Voronoï admissible if its faces belong to the Voronoï diagram obtained from its vertices. FIG. 4 illustrates in 2D the stages of 1) passage from the CPG space to the Cartesian space and of 2) correction of the Cartesian space. The thin black lines represent the CPG grid on the left, then converted to a Cartesian grid at the centre and on the right. The shaded area corresponds to an area around the radial grid. It is the cavity necessary for creation of the hybrid grid. The hexagon at the centre of each image corresponds to the radial well grid. The thick black lines represent the boundaries of the cavity. They are constraint surfaces for the generation of the hybrid grid. Finally, the dotted line at the centre of the hexagon in the middle image represents an ideal radial grid R2. Number 1 represents the stage corresponding to the passage from the CPG type grid to the Cartesian type grid and number 2 indicates the stage corresponding to the correction of deformation function $\phi$.

The goal of this stage thus is to correct the boundary of the radial grid so as to return thereto the geometrical properties necessary for generation of the polyhedral grid. Deformation function $\phi$ is thus locally deformed so that the deformation of the radial grid by this function induces a grid whose boundary meets the conditions required for generation of a hybrid grid.

This is achieved by modifying deformation function $\phi$ by displacement of the vertices and recursive adaptive refinement of the tetrahedra, so that the well grid deformed by function $\phi$ is Delaunay admissible and Voronoï admissible. This can be reached by carrying out the following two stages:

a) Determination of an Ideal Image of the Radial Grid Around the Well

By modelling reservoirs, the physical well is simply represented by a curve following its trajectory. In order to obtain a surface having the properties required for generation of the polyhedral grid, the circular radial grid is reconstructed around the image trajectory by $\phi$ of the initial trajectory. The radial grid reconstruction method used is a conventional method for constructing the initial grid, i.e. sweeping the circular section along the well trajectory. Two radial grids are thus available:

a radial grid R1) deformed and that one wants to modify by correcting function $\phi$ a radial grid R2, ideal by construction.

b) Correction of the Deformation Function at the Edge of the Radial Grid

In order to correct function $\phi$ in the vicinity of the radial grid, grid R1 is modified in such a way that it resembles grid R2. The position of the vertices of the Cartesian grid therefore has to be sought, in the vicinity of the well, so that the image by the deformation function of the initial radial grid corresponds to R2. The vertices of the Cartesian space are therefore displaced iteratively until the desired result is obtained. The method comprises the following stages:

defining an area, referred to as well vicinity, around the radial grid. It is advantageously the cavity necessary for creation of the hybrid grid. Patent application EP-05 291 047 8 describes a method for constructing such a cavity, calculating displacement vectors allowing to determine a vector for each one of the vertices of the Cartesian space contained in the vicinity of the well.

In fact, passage from R1 to R2 can be described by the displacement of the vertices of R1 according to a vector that is specific to each vertex. All of these vectors form a vector field. This vector field being only defined on the vertices of R1, vectors are defined at each vertex of the Cartesian space. The three methods described hereafter allow to calculate the displacement vectors at each vertex of the Cartesian space.

(i) Extrapolation of the Displacement Field in the Tetrahedra

The tetrahedral cells can contain vertices of R1. In this case, the result of the weighted mean of the vectors of the vertices present in the tetrahedron is assigned to a vertex of the tetrahedron. Weighting corresponds to the barycentric coordinate of the vertex of R1 relative to the (tetrahedron) vertex considered.

(ii) Extrapolation of the Displacement Field Outside the Tetrahedra

When all the tetrahedra containing vertices have been processed, the vectors previously calculated are extrapolated to the vertices of the Cartesian space on which the previous extrapolation was impossible. This extrapolation consists, for each vertex of the Cartesian space whose displacement vector is zero:

in examining all the other vertices located at a predetermined distance, in averaging their associated displacement vector by weighting with a coefficient.

The weighting coefficient corresponds to the result of the exponential of the opposite of the square of the distance (Gaussian function of distance).

(iii) Minimization of the Deformation

In order to minimize at the most the deformation of the space after its "correction", one wants to minimize the deformation of the tetrahedral cells in relation to their shape in the Cartesian space.

The deformation corresponds to the norm of the "difference matrix" between the matrix of the linear application defining the "initial cell to deformed cell" conversion and the matrix of the identity linear application. It is thus possible, for a vertex of a given tetrahedral cell in its initial state and deformed, to calculate the position minimizing the previously defined norm. A displacement vector for changing from the current configuration to that of the minimum deformation is deduced therefrom.

a displacement vector of zero norm is assigned to the vertices corresponding to the outer edges of the cavity in order not to degrade the properties obtained by defining a Cartesian space, the displacements of the vertices of the Cartesian space are then applied under control of the validity of the tetrahedral cells. If a vertex displacement makes one or more cells invalid, the vertex is not displaced and these cells are marked "to be refined", this procedure is repeated until the displacement of the vertices is zero, the image of the radial grid by the redefined deformation function is then compared with ideal grid R2.

If the two grids match (position of the vertices of the grids identical within epsilon), the deformation function is correctly defined and construction of the polyhedral transition grid is then possible.

In the opposite case, the two grids do not match, which means that the deformation function correction is not sufficient: there are cells marked "to be refined". The definition of the deformation function is then enriched by subdividing tetrahedral cells of the Cartesian space, which is referred to as recursive adaptive refinement of the tetrahedra. Subdivision first consists in locating the responsible tetrahedra (marked "to be refined"), i.e. containing radial grid vertices that do not match those of R2. Subdivision of these tetrahedra is then carried out according to a conventional method using predetermined units. In practice, the vertices of the modified Cartesian space are reinitialized by returning to their prior position before subdivision is performed so as to keep the validity of the tetrahedral cells. Once the subdivision achieved, the loop described above is rerun on the enriched Cartesian space. This loop is applied as many times as necessary to obtain matching between the image of the radial grid by the deformation function and R2.

3) Construction of a Hybrid Grid in the "Cartesian" Frame

From the two grids thus deformed and described in the "Cartesian" frame, it is possible to apply any known method for generating a hybrid grid in this corrected "Cartesian" frame. The method described in patent application EP-05 291 047 8 can be advantageously used. This method allows to generate a hybrid grid by combining structured grids and unstructured grids. The hybrid grid is obtained by associating a first structured grid for gridding the reservoir with second structured grids for gridding zones around wells or faults. According to this method, a cavity of minimum size allowing the cells of the transition grid to have an intermediate size between the size of the cells of the first grid and the size of the cells of the second grids is first generated entirely automatically. Then a transition grid meeting the constraints of the numerical scheme used for simulation of the fluid flows within the reservoir is constructed. Finally, the quality of the transition grid is improved by optimizing it under quality controls in the numerical scheme sense, in order to define a perfectly admissible transition grid in the sense of the numerical scheme selected.

4) Deformation of the Hybrid Grid by Applying Deformation Function $\phi^{-1}$

The next stage consists in deforming the hybrid grid of the corrected "Cartesian" frame to return to the "CPG" frame, by applying the method described in patent FR-2,891,383 for a tetrahedral-cell grid. This method consists in carrying out the following operations for each vertex P:

seeking the tetrahedral cell of the "Cartesian" frame that contains point P, defining deformation function $\phi^{-1}$ associated with the tetrahedral cell of the "Cartesian" frame, applying this deformation function $\phi^{-1}$ to point P.

Finally, the hybrid grid can be optimized in order to recover characteristics that would have been altered by the final grid deformation. In particular, optimization as such is interesting because the quality (scheme convergence, result accuracy) of the numerical solutions associated with the nodes of a grid obviously depends on the quality thereof. The method according to the invention therefore comprises, at the end of the hybrid grid generation procedure, an optimization stage that consists in improving the quality of the grid.

The hybrid grid thus generated can be directly used in a flow simulator. Thus, the method according to the invention allows to simulate gas or oil production profiles so as to assess the profitability of a reservoir, to validate or to optimize the position of the wells ensuring production development. The method thus allows to estimate the repercussions of a technological or strategic change on the production of a reservoir (selection of the location of new wells to be drilled, optimization and selection during well completion, . . . ).

The method comprises generating a three-dimensional hybrid grid from CPG type grids and structured grids such as radial grids, so as to finely represent the structure and the behaviour of a heterogeneous medium crossed by at least one geometric discontinuity. This hybrid grid allows to take into account physical phenomena that take place in the vicinity of geometric discontinuities such as wells or fractures, during reservoir simulations allowing to characterize fluid flows.

This grid is, on the one hand, suited to the complexity of the geometry of the geologic structure studied and, on the other hand, to the radial directions of flow in the vicinity of wells, in drainage zones. Finally, the hybrid grid generated according to the invention is admissible in the finite volumes sense: it has conformity, orthogonality, convexity and self-centering properties.

According to the method, the hybrid grid thus generated is used in a flow simulator to model fluid displacements in the medium, by redefining the notion of normality between the faces of the grid cells. This notion is also used to define an orthogonality criterion required for optimization.

The method for generating the hybrid grid has been used within the context of the evaluation of a petroleum reservoir. It is however clear that such a hybrid grid construction technique can be used in any technical sphere requiring grids of different types (car industry, aeronautics, . . . ).

The invention claimed is:

1. A method for evaluating fluid flows in a heterogeneous medium crossed by at least one geometric discontinuity, by means of simulation, from a hybrid grid whose generation comprises forming at least a first Corner Point Geometry (CPG) type structured grid for gridding at least a part of the heterogeneous medium and forming at least a second structured grid for gridding at least a part of said at least one geometric discontinuity, said grids comprising cells defined by vertices identified by coordinates in a reference frame referred to as a "CPG" frame, the method comprising the following stages:
    defining a deformation function $\phi$ by deforming at least a part of said first CPG type structured grid into a non-uniform Cartesian grid whose vertices are then identified by coordinates in a frame referred to as a "Cartesian" frame,
    discretizing cells of said first CPG type structured grid located around said second grid into tetrahedral cells,
    interpolating said deformation function $\phi$ within each tetrahedral cell so as to allow determination of the coordinates of a point in said "CPG" frame from the coordinates of this point in said "Cartesian" frame,
    deforming said second grid by expressing the coordinates of the vertices of said second grid in said "Cartesian" frame, by means of said deformation function $\phi$,
    modifying said deformation function $\phi$ by displacement of the vertices and recursive adaptive refinement of said tetrahedra, so that said second grid deformed by said deformation function $\phi$ is Delaunay admissible and Voronoï admissible,
    generating in said "Cartesian" frame a hybrid grid by constructing a conformal transition grid between said Cartesian grid and said second grid deformed by said deformation function $\phi$ thus modified,
    deforming said hybrid grid by calculating the coordinates of vertices of said hybrid grid in the "CPG" frame, by means of the inverse of said deformation function $\phi$ thus modified.

2. A method as claimed in claim 1, wherein said deformation function $\phi$ is modified by applying the following stages:
    constructing a third structured grid for gridding said part of said at least one geometric discontinuity around an image trajectory by said deformation function $\phi$ of an initial trajectory of said at least one geometric discontinuity,
    modifying said deformation function $\phi$ by iteratively displacing the vertices of the tetrahedra, so that the vertices of said second grid deformed by said deformation function $\phi$ thus modified have substantially the same positions as the vertices of said third grid.

3. A method as claimed in claim 2, wherein the vertices are displaced by calculating displacement vectors at each vertex of the tetrahedra as follows:
    for any tetrahedron containing vertices of said second grid deformed by said deformation function $\phi$, assigning to a tetrahedron vertex a weighted mean of the vectors of the vertices present in the tetrahedron, weighting corresponding to a barycentric coordinate of the vertex relative to the vertex of the tetrahedron considered,
    for any tetrahedron containing no vertex of said second grid, extrapolating the vectors by examining all the other vertices of the tetrahedron located at a predetermined distance and by weighting their associated displacement vector while weighting by a Gaussian function of said distance.

4. A method as claimed in claim 2, wherein the vertices are displaced by calculating displacement vectors at each vertex of the tetrahedra by minimizing the deformation of the tetrahedral cells with respect to their shape in said "Cartesian" frame.

5. A method as claimed in claim 2, wherein the vertices are displaced under validity control of the tetrahedral cells: if a vertex displacement makes at least one cell invalid, the vertex is not displaced and the cell is marked "to be refined".

6. A method as claimed in claim 3, wherein the vertices are displaced under validity control of the tetrahedral cells: if a vertex displacement makes at least one cell invalid, the vertex is not displaced and the cell is marked "to be refined"; and the stages are applied iteratively until said displacement vectors are zero, then all the cells marked "to be refined" are refined by subdividing them.

7. A method as claimed in claim 6, wherein the method is applied iteratively until the cells marked "to be refined" are exhausted.

8. A method as claimed in claim 4, wherein the vertices are displaced under validity control of the tetrahedral cells: if a vertex displacement makes at least one cell invalid, the vertex is not displaced and the cell is marked "to be refined"; and the stages are applied iteratively until said displacement vectors are zero, then all the cells marked "to be refined" are refined by subdividing them.

9. A method as claimed in claim 8, wherein the method is applied iteratively until the cells marked "to be refined" are exhausted.

* * * * *